(12) United States Patent
Chadha et al.

(10) Patent No.: US 7,505,405 B2
(45) Date of Patent: Mar. 17, 2009

(54) METHOD, APPARATUS, AND COMPUTER PROGRAM PRODUCT FOR OPTIMIZING PACKET FLOW CONTROL THROUGH BUFFER STATUS FORWARDING

(75) Inventors: Sundeep Chadha, Austin, TX (US); Bernard Charles Drerup, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 635 days.

(21) Appl. No.: 10/961,738

(22) Filed: Oct. 8, 2004

(65) Prior Publication Data

US 2006/0077896 A1 Apr. 13, 2006

(51) Int. Cl.
*H04L 12/28* (2006.01)
(52) U.S. Cl. ............... 370/230; 370/235; 370/413; 370/415; 370/417; 709/232
(58) Field of Classification Search ............ 370/235, 370/236, 249, 412, 413, 415, 417
See application file for complete search history.

(56) References Cited

U.S. PATENT DOCUMENTS

| | | | |
|---|---|---|---|
| 4,458,314 A | 7/1984 | Grimes | |
| 4,868,741 A * | 9/1989 | Gula et al. | 710/113 |
| 5,164,939 A * | 11/1992 | Shobatake | 370/416 |
| 5,313,454 A * | 5/1994 | Bustini et al. | 370/231 |
| 5,339,313 A | 8/1994 | Ben-Michael et al. | |
| 5,412,648 A | 5/1995 | Fan | |
| 6,091,725 A | 7/2000 | Cheriton et al. | |
| 6,092,108 A | 7/2000 | DiPlacido et al. | |
| 6,108,307 A | 8/2000 | McConnell et al. | |
| 6,115,356 A * | 9/2000 | Kalkunte et al. | 370/229 |

(Continued)

OTHER PUBLICATIONS

F. Nuno et al., "VD/VS Coupling Scheme Using Feed-Forward Congestion Indication for ABR Services in Wireless ATM," Universal Personal Communications, 1998; ICUPC '98; IEEE 1998 International Conference.
M. Karol et al., "Prevention of Deadlocks and Livelocks in Lossless, Backpressured Packet Networks," INFOCOM 2000, 19th Annual Joint Conference of the IEEE Computer and Communications Societies.

(Continued)

*Primary Examiner*—Chi H. Pham
*Assistant Examiner*—Shick Hom
(74) *Attorney, Agent, or Firm*—Joan Pennington (57) ABSTRACT

A method, apparatus and computer program product are provided for optimizing packet flow control through buffer status forwarding. A sending device includes buffer status information of the sending device in transactions being sent to a receiving device. The receiving device uses the buffer status information of the sending device for selecting transactions to offload.

3 Claims, 11 Drawing Sheets

U.S. PATENT DOCUMENTS

| | | | |
|---|---|---|---|
| 6,243,359 B1* | 6/2001 | Roy et al. | 370/230 |
| 6,438,138 B1* | 8/2002 | Kamiya | 370/468 |
| 6,453,404 B1* | 9/2002 | Bereznyi et al. | 711/171 |
| 6,584,111 B1* | 6/2003 | Aweya et al. | 370/412 |
| 2003/0169758 A1* | 9/2003 | Lavigne et al. | 370/428 |
| 2004/0136390 A1* | 7/2004 | Kim et al. | 370/412 |
| 2005/0249227 A1* | 11/2005 | Wang et al. | 370/412 |
| 2005/0278584 A1* | 12/2005 | Asami et al. | 714/45 |
| 2006/0221945 A1* | 10/2006 | Chin et al. | 370/381 |

OTHER PUBLICATIONS

A. Pitsillides et al., "Congestion Control for Differentiated-Services using Non-Linear Control Theory," Computers and Communications, 2001, 6th IEEE Symposium.

C. Chow et al., "Congestion Control of Poisson Distributed ABR Applications in ATM Networks Using Neural Network," TENCON '02, 2002 IEEE Region 10 Conference on Computers, Communications, Control and Power Engineering.

* cited by examiner

BUFFER STATUS TIMELINE WITH PRIOR ART FLOW CONTROL

| TIME ELAPSED | BUFFER STATUS FOR DEVICE 1 TYPE | | BUFFER STATUS FOR DEVICE 2 TYPE | | ACTION DURING TIME UNIT N |
|---|---|---|---|---|---|
| | A | B | A | B | |
| 0 | 0 | 4 | 7 | 7 | INITIAL STATE |
| 1 | 0 | 4 | 6 | 8 | D2 SENDS OUT TYPE A, RECEIVES TYPE B, D1 SENDS OUT TYPE B, RECEIVES TYPE B SYSTEM SENDS 1 TRANSACTION TO D1 |
| 2 | 0 | 5 | 6 | 7 | D2 SENDS OUT TYPE B, RETRIES TYPE B D1 IS RETRIED WHILE SENDING TYPE B, RECEIVES TYPE B SYSTEM SENDS 2 TRANSACTION TO D1 |
| 3 | 0 | 5 | 5 | 8 | D2 SENDS OUT TYPE A, RECEIVES TYPE B, D1 SENDS OUT TYPE B, RECEIVES TYPE B SYSTEM SENDS 3 TRANSACTION TO D1 |
| 4 | 0 | 6 | 5 | 7 | D2 SENDS OUT TYPE B, RETRIES TYPE B D1 IS RETRIED WHILE SENDING TYPE B, RECEIVES TYPE B SYSTEM SENDS 4 |

FIG. 4A

| | | | | | |
|---|---|---|---|---|---|
| | | | | | TRANSACTION TO D1 |
| 5 | 0 | 6 | 4 | 8 | D2 SENDS OUT TYPE A, RECEIVES TYPE B<br>D1 SENDS OUT TYPE B, RECEIVES TYPE B<br>SYSTEM SENDS 5 TRANSACTION TO D1 |
| 6 | 0 | 7 | 4 | 7 | D2 SENDS OUT TYPE B, RETRIES TYPE B<br>D1 IS RETRIED WHILE SENDING TYPE B, RECEIVES TYPE B<br>SYSTEM SENDS 6 TRANSACTION TO D1 |
| 7 | 0 | 7 | 3 | 8 | D2 SENDS OUT TYPE A, RECEIVES TYPE B<br>D1 SENDS OUT TYPE B, RECEIVES TYPE B<br>SYSTEM SENDS 7 TRANSACTION TO D1 |
| 8 | 0 | 8 | 3 | 7 | D2 SENDS OUT TYPE B, RETRIES TYPE B<br>D1 IS RETRIED WHILE SENDING TYPE B, RECEIVES TYPE B<br>SYSTEM SENDS 8 TRANSACTION TO D1 |
| 9 | 0 | 7 | 2 | 8 | D2 SENDS OUT TYPE A, RECEIVES TYPE B<br>D1 SENDS OUT TYPE B, RETRIES TYPE B<br>SYSTEM UNABLE TO SEND ANY TYPE B TO D1 |
| 10 | 0 | 8 | 2 | 7 | D2 SENDS OUT TYPE B, RETRIES TYPE B |

FIG. 4B

| | | | | | |
|---|---|---|---|---|---|
| | | | | | D1 IS RETRIED WHILE SENDING TYPE B, RECEIVES TYPE B SYSTEM SENDS 9 TRANSACTION TO D1 |
| 11 | 0 | 7 | 1 | 8 | D2 SENDS OUT TYPE A, RECEIVES TYPE B D1 SENDS OUT TYPE B, RETRIES TYPE B SYSTEM UNABLE TO SEND ANY TYPE B TO D1 |
| 12 | 0 | 8 | 1 | 7 | D2 SENDS OUT TYPE B, RETRIES TYPE B D1 IS RETRIED WHILE SENDING TYPE B, RECEIVES TYPE B SYSTEM SENDS 10 TRANSACTION TO D1 |
| 13 | 0 | 7 | 0 | 8 | D2 SENDS OUT TYPE B, RECEIVES TYPE B D1 SENDS OUT TYPE B, RETRIES TYPE B SYSTEM UNABLE TO SEND ANY TYPE B TO D1 |
| 14 | 0 | 8 | 0 | 7 | D2 SENDS OUT TYPE B, RECEIVES TYPE B D1 SENDS OUT TYPE B, RECEIVES TYPE B SYSTEM SENDS 11 TRANSACTION TO D1 |
| 15 | 0 | 7 | 0 | 7 | D2 SENDS OUT TYPE B, RECEIVES TYPE B D1 SENDS OUT TYPE B, RETRIES TYPE B |

FIG. 4C

|    |   |   |   |   | SYSTEM UNABLE TO SEND ANY TYPE B TO D1 |
|----|---|---|---|---|---|
| 16 | 0 | 7 | 0 | 7 | D2 SENDS OUT TYPE B, RECEIVES TYPE B<br>D1 SENDS OUT TYPE B, RECEIVES TYPE B<br>SYSTEM SENDS 12 TRANSACTION TO D1<br>SYSTEM STOPS SENDING ADDITIONAL TRANSACTIONS |
| 17 | 0 | 6 | 0 | 7 | D2 SENDS OUT TYPE B<br>D1 SENDS OUT TYPE B |
| 18 | 0 | 5 | 0 | 7 | D2 SENDS OUT TYPE B<br>D1 SENDS OUT TYPE B |
| 19 | 0 | 4 | 0 | 7 | D2 SENDS OUT TYPE B<br>D1 SENDS OUT TYPE B |
| 20 | 0 | 3 | 0 | 7 | D2 SENDS OUT TYPE B<br>D1 SENDS OUT TYPE B |
| 21 | 0 | 2 | 0 | 7 | D2 SENDS OUT TYPE B<br>D1 SENDS OUT TYPE B |
| 22 | 0 | 1 | 0 | 7 | D2 SENDS OUT TYPE B<br>D1 SENDS OUT TYPE B |
| 23 | 0 | 0 | 0 | 7 | D2 SENDS OUT TYPE B<br>D1 SENDS OUT TYPE B |
| 24 | 0 | 0 | 0 | 6 | D2 SENDS OUT TYPE B |
| 25 | 0 | 0 | 0 | 5 | D2 SENDS OUT TYPE B |
| 26 | 0 | 0 | 0 | 4 | D2 SENDS OUT TYPE B |
| 27 | 0 | 0 | 0 | 3 | D2 SENDS OUT TYPE B |
| 28 | 0 | 0 | 0 | 2 | D2 SENDS OUT TYPE B |
| 29 | 0 | 0 | 0 | 1 | D2 SENDS OUT TYPE B |
| 30 | 0 | 0 | 0 | 0 | D2 SENDS OUT TYPE B |

FIG. 4D

BUFFER STATUS TIMELINE WITH TRANSACTION OFFLOAD FLOW CONTROL 110, 210

| TIME ELAPSED | BUFFER STATUS FOR DEVICE 1 TYPE | | BUFFER STATUS FOR DEVICE 2 TYPE | | ACTION DURING TIME UNIT N |
| --- | --- | --- | --- | --- | --- |
| | A | B | A | B | |
| 0 | 0 | 4 | 7 | 7 | INITIAL STATE |
| 1 | 0 | 4 | 7 | 7 | D2 SENDS OUT TYPE B, RECEIVES TYPE B, D1 SENDS OUT TYPE B, RECEIVES TYPE B SYSTEM SENDS 1 TRANSACTION TO D1 |
| 2 | 0 | 4 | 7 | 7 | D2 SENDS OUT TYPE B, RECEIVES TYPE B, D1 SENDS OUT TYPE B, RECEIVES TYPE B SYSTEM SENDS 2 TRANSACTION TO D1 |
| 3 | 0 | 4 | 7 | 7 | D2 SENDS OUT TYPE B, RECEIVES TYPE B, D1 SENDS OUT TYPE B, RECEIVES TYPE B SYSTEM SENDS 3 TRANSACTION TO D1 |
| 4 | 0 | 4 | 7 | 7 | D2 SENDS OUT TYPE B, RECEIVES TYPE B, D1 SENDS OUT TYPE B, RECEIVES TYPE B SYSTEM SENDS 4 TRANSACTION TO D1 |
| 5 | 0 | 4 | 7 | 7 | D2 SENDS OUT TYPE B, RECEIVES TYPE B, |

FIG. 5A

| | | | | | |
|---|---|---|---|---|---|
| | | | | | D1 SENDS OUT TYPE B, RECEIVES TYPE B SYSTEM SENDS 5 TRANSACTION TO D1 |
| 6 | 0 | 4 | 7 | 7 | D2 SENDS OUT TYPE B, RECEIVES TYPE B, D1 SENDS OUT TYPE B, RECEIVES TYPE B SYSTEM SENDS 6 TRANSACTION TO D1 |
| 7 | 0 | 4 | 7 | 7 | D2 SENDS OUT TYPE B, RECEIVES TYPE B, D1 SENDS OUT TYPE B, RECEIVES TYPE B SYSTEM SENDS 7 TRANSACTION TO D1 |
| 8 | 0 | 4 | 7 | 7 | D2 SENDS OUT TYPE B, RECEIVES TYPE B, D1 SENDS OUT TYPE B, RECEIVES TYPE B SYSTEM SENDS 8 TRANSACTION TO D1 |
| 9 | 0 | 4 | 7 | 7 | D2 SENDS OUT TYPE B, RECEIVES TYPE B, D1 SENDS OUT TYPE B, RECEIVES TYPE B SYSTEM SENDS 9 TRANSACTION TO D1 |
| 10 | 0 | 4 | 7 | 7 | D2 SENDS OUT TYPE B, RECEIVES TYPE B, D1 SENDS OUT TYPE B, RECEIVES TYPE B SYSTEM SENDS 10 TRANSACTION TO D1 |
| 11 | 0 | 4 | 7 | 7 | D2 SENDS OUT TYPE B, RECEIVES TYPE B, |

FIG. 5B

| | | | | | D1 SENDS OUT TYPE B, RECEIVES TYPE B SYSTEM SENDS 11 TRANSACTION TO D1 |
|---|---|---|---|---|---|
| 12 | 0 | 4 | 7 | 7 | D2 SENDS OUT TYPE B, RECEIVES TYPE B, D1 SENDS OUT TYPE B, RECEIVES TYPE B SYSTEM SENDS 12 TRANSACTION TO D1 SYSTEM STOPS SENDING ADDITIONAL TRANSACTIONS |
| 13 | 0 | 3 | 7 | 7 | D2 SENDS OUT TYPE B, RECEIVES TYPE B |
| 14 | 0 | 2 | 7 | 7 | D2 SENDS OUT TYPE B, RECEIVES TYPE B |
| 15 | 0 | 1 | 7 | 7 | D2 SENDS OUT TYPE B, RECEIVES TYPE B |
| 16 | 0 | 0 | 7 | 7 | D2 SENDS OUT TYPE B, RECEIVES TYPE B |
| 17 | 0 | 0 | 6 | 7 | D2 SENDS OUT TYPE A |
| 18 | 0 | 0 | 6 | 6 | D2 SENDS OUT TYPE B |
| 19 | 0 | 0 | 5 | 6 | D2 SENDS OUT TYPE A |
| 20 | 0 | 0 | 5 | 5 | D2 SENDS OUT TYPE B |
| 21 | 0 | 0 | 4 | 5 | D2 SENDS OUT TYPE A |
| 22 | 0 | 0 | 4 | 4 | D2 SENDS OUT TYPE B |
| 23 | 0 | 0 | 3 | 4 | D2 SENDS OUT TYPE A |
| 24 | 0 | 0 | 3 | 3 | D2 SENDS OUT TYPE B |
| 25 | 0 | 0 | 2 | 3 | D2 SENDS OUT TYPE A |
| 26 | 0 | 0 | 2 | 2 | D2 SENDS OUT TYPE B |
| 27 | 0 | 0 | 1 | 2 | D2 SENDS OUT TYPE A |
| 28 | 0 | 0 | 1 | 1 | D2 SENDS OUT TYPE B |
| 29 | 0 | 0 | 0 | 1 | D2 SENDS OUT TYPE A |
| 30 | 0 | 0 | 0 | 0 | D2 SENDS OUT TYPE B |

METHOD, APPARATUS, AND COMPUTER PROGRAM PRODUCT FOR OPTIMIZING PACKET FLOW CONTROL THROUGH BUFFER STATUS FORWARDING

FIELD OF THE INVENTION

The present invention relates generally to the data processing field, and more particularly, relates to a method, apparatus and computer program product for optimizing packet flow control through buffer status forwarding.

DESCRIPTION OF RELATED ART

A computer system performs many functions. Almost all of the functions either require or include transfer of data from one device to another. The devices can be directly connected to each other but frequently are connected through a multitude of devices in between them. These devices help the movement of data by holding it intermediately in its passage from the source device to the destination device.

There are many ways employed to transfer data from one device to another. One of the ways includes many devices connected to each other through a common set of signals called bus. At any given time a device can initiate a request to transfer data. Other intermediate devices on the bus then decode the information, hold the data temporarily in their storage area, also called buffers, and pass it on its way to the final destination, as appropriate. Another method includes that the sender of the data pack all the appropriate information in a block and send it over on the bus. The block of the data, also called a packet, is then often held by an intermediate receiving device in its buffers before being sent out to another intermediate device or the final destination.

The speed with which the data from the source reaches the destination is dependent, along with other factors, on the algorithm employed by a device to offload the data from its buffers to send the data along its way to a final destination. The algorithm employed by the device to offload its buffers is frequently dependent upon the order and the priority associated with the various transactions. The device looks at the arrival time and priority of the transactions in the buffer and decides which transactions will go out first. This order is sometimes fixed, but also sometimes flexible, so that the device can look at the state of its buffers before deciding which buffers have to be offloaded sooner.

The offloading capacity of the device can affect the data flow for the other devices and for the system as a whole. For example, if the device buffers are filled with more type A transactions than type B transactions and type A transactions can be sent before type B then the device can decide to offload more type A transactions. This will prevent type A transactions from getting blocked up in the sender device as now they can be speedily accepted. This method might provide optimal data flow within the device but does not improve the data flow within a system as it has no information about the state of the buffer to the other devices.

Many busses and communication protocols include a mechanism by which receiving devices pass information about their buffers back toward the sender. This is called flow control or congestion control, and allows the sender to adjust its selection about offloading the buffers to be more optimal for the receiving device.

A need exists for an effective mechanism for optimizing packet flow control.

SUMMARY OF THE INVENTION

Principal aspects of the present invention are to provide a method, apparatus and computer program product for optimizing packet flow control through buffer status forwarding. Other important aspects of the present invention are to provide such method, apparatus and computer program product for optimizing packet flow control through buffer status forwarding. substantially without negative effect and that overcome many of the disadvantages of prior art arrangements.

In brief, a method, apparatus and computer program product are provided for optimizing packet flow control through buffer status forwarding. A sending device includes buffer status information of the sending device in transactions being sent to a receiving device. The receiving device uses the buffer status information of the sending device for selecting transactions to offload.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
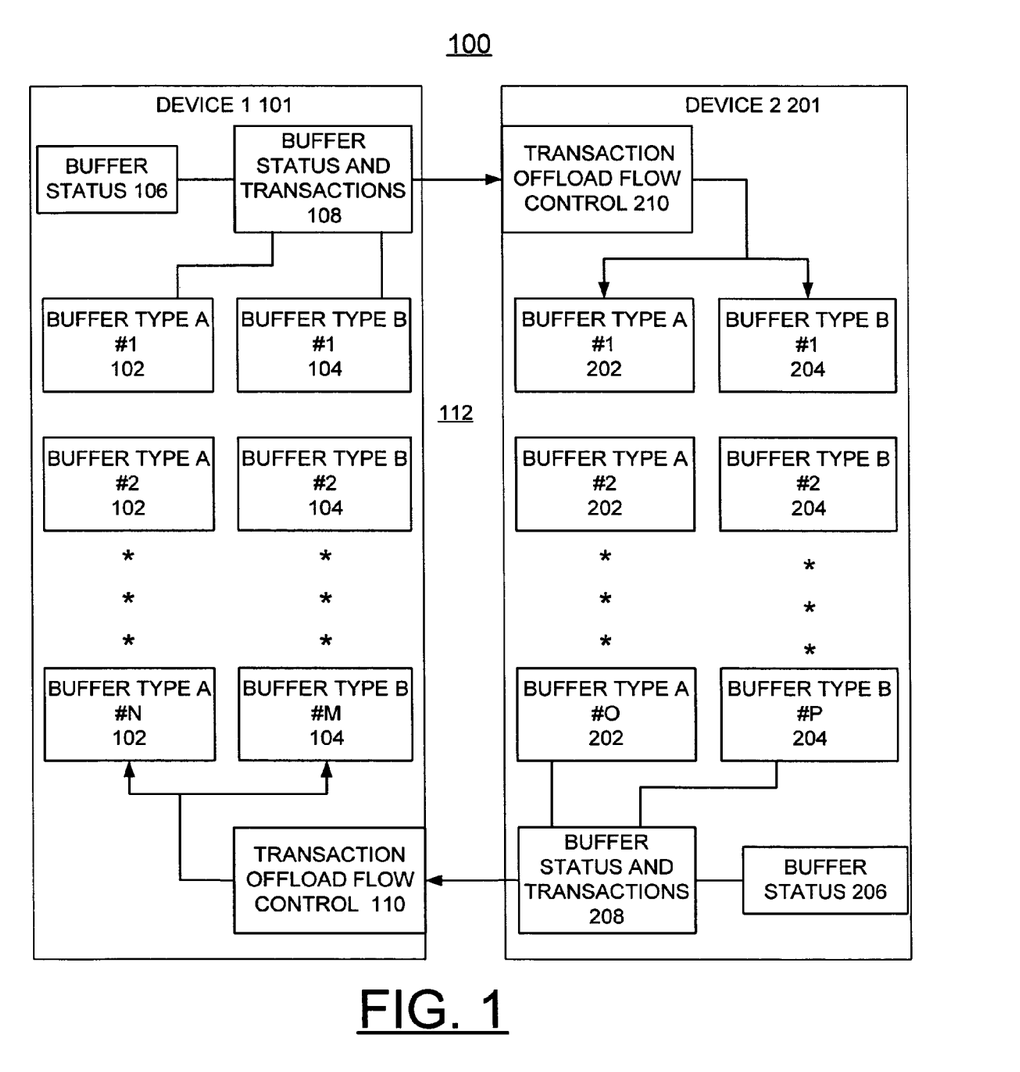
FIG. 1 is a block diagram representation illustrating a system for optimizing packet flow control through buffer status forwarding in accordance with the preferred embodiment.

Having reference now to the drawings, in FIG. 1, there is shown a computer system generally designated by the reference character 100 for carrying out methods for optimizing packet flow control through buffer status forwarding in accordance with the preferred embodiment. Computer system includes a first device 1, 101 including a plurality of buffers 1-N, 102 for type A transactions and a plurality of buffers 1-M, 104 for type B transactions. Computer system includes a second device 2, 201 including a plurality of buffers 1-O, 202 for type A transactions and a plurality of buffers 1-P, 204 for type B transactions. Device 1, 101, includes a buffer status 106 of the sending device 1 for forwarding a respective transaction 108 with the sending device buffer status to a receiving device 2, 201. Device 2, 201, includes a buffer status 206 of the sending device 2 for forwarding a respective transaction 208 with the sending device buffer status to a receiving device 1, 101. Each device 1, 101, device 2, 201 includes a transaction offload flow control 110, 210 for optimizing packet flow control using the sending device buffer status forwarding in accordance with the preferred embodiment. A system communication network or bus generally designated by the reference character 112 connects the device 1, 101 and the device 2, 201.

In accordance with features of the preferred embodiment, forwarding the buffer status of the sending device to the receiving device enables the buffer status of the sending device to be used by the receiving device in deciding which transactions should be offloaded before other transactions, such that a more optimal flow control can be achieved by preventing congestions and bottlenecks.

In FIG. 1, computer system 100 is shown in simplified form sufficient for understanding features of the invention. It should be understood that the device 1, 101 and the device 2, 201 are connected to multiple other devices. It should be understood that the transaction flow between the device 1, 101 and the device 2, 201 can be unidirectional or bidirectional. In the case of bidirectional flow between the device 1, 101 and the device 2, 201, the forwarding of the buffer status of the sending device to the receiving device and the ordering of transactions to be offloaded by the receiving device applies independently of the direction of transaction flow.

In accordance with features of the preferred embodiment, the buffer status 106 of the sending device 1, 101 and the buffer status 206 of the sending device 2, 201 that is included in the transactions that are sent across to the respective receiver device 2, 201 and device 1, 101. The receiver device 2, 201 and device 1, 101 then, while making decision about what transaction to offload from the buffer, advantageously employs an efficient algorithm that can expedite the data flow in the system. For example, consider that device 1, 101 is a sender and device 2, 201 is a receiver. Both the devices 1, 101 and 2, 201 have buffers 102, 104 and 202, 204 used for transaction type A and type B. Device 2, 201 has equal number of transaction type A and type B in its buffers 202, 204 and conventionally would otherwise offload both transaction types A and B with equal priority. Device 1, 101 on the other hand, has more type B transactions in the buffers 102, 104 because the system is trying to move more type B transactions across the system temporarily. If device 2, 201 is not aware of the state of buffers 102, 104 of device 1, 101, device 2, 201 will not offload more type B transactions, and thus, at some point in time, all the type B buffers 104 in device 1, 101 become full. This creates congestion or bottlenecks and would affect the overall system capacity to move data.

In accordance with features of the preferred embodiment, when device 1, 101 forwards its buffer status 106 to device 2, 201 and device 2, 201 uses that forwarded buffer status information to make a decision on what types of transactions to offload first, the resulting transaction traffic flow is better regulated and prevents device 1, 101 transaction type B buffers 102 from filling up and creating congestion. This use of the forwarded buffer status information also results in more optimal system performance.

A respective prior art graph and a corresponding table of FIG. 2 and FIGS. 4A, 4B, 4C, and 4D illustrates a time line of the buffer status for Type A and Type B transactions for device 1, 101 and device 2, 201 when the flow control of the preferred embodiment is not implemented. A respective graph and corresponding tables of FIG. 3 and FIGS. 5A, 5B, and 5C illustrates a time line of the buffer status for Type A and Type B transactions for device 1, 101 and device 2, 201 when flow control of the preferred embodiment is implemented respectively.

In the illustrated prior art timeline and in the time line in accordance with the preferred embodiment it is assumed, for the sake of simplicity, that each device 1, 101 and device 2, 201 has 8 buffers 102, 202 for Type A and 8 buffers 104, 204 for Type B transactions. It is further assumed that it takes one time unit for each device 1, 101 and device 2, 201 to offload a transaction of any type from its buffer and pass this information up within itself. That way the device can accept the transaction of that specific type, if presented on its receive interface during the next time unit. Initial state of buffers as shown in first row is assumed. It is further assumed that system 100 wants to transmit 12 additional transactions across the devices.

Referring to FIG. 2 and FIGS. 4A, 4B, 4C, and 4D, there are shown a time line of prior art transaction flow actions per time unit. As shown in FIG. 2 and FIGS. 4A, 4B, 4C, and 4D, when the flow control of the preferred embodiment is not followed, then device 1, 101 Type B buffers 104 eventually become full. As shown FIG. 2 when the buffer status reaches full at time units 9, 11, 13, and 15, device 1, 101 has to issue the retry indication to the device upstream, device 2, 201, thereby wasting the system bandwidth.

Figure 2:
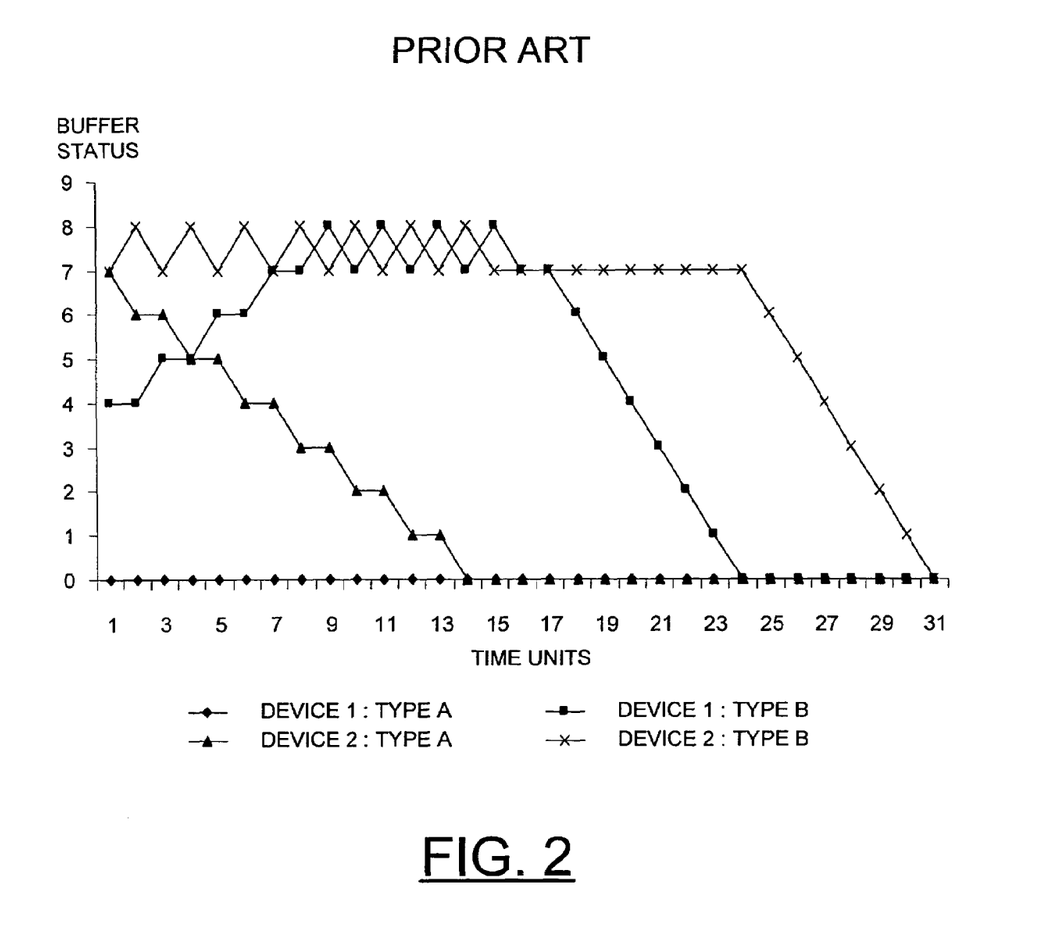
FIG. 2 is a graph illustrating a time line of prior art transaction flow actions per time unit.
Figure 3:
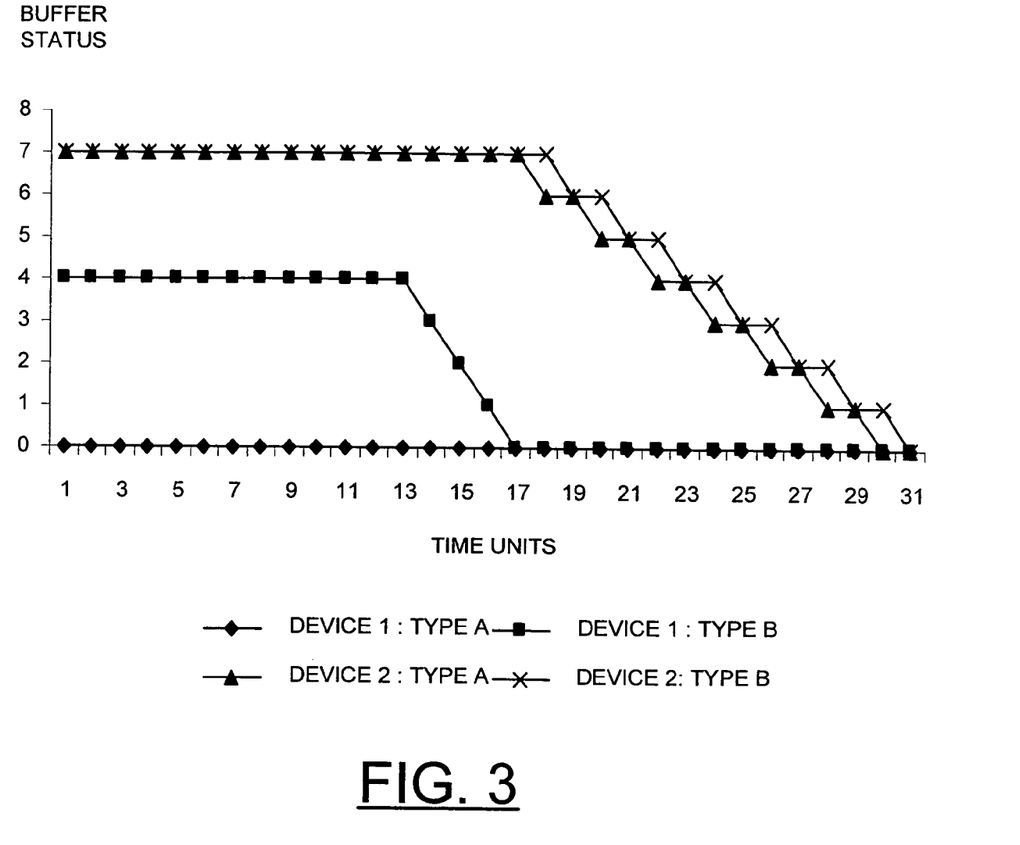
FIG. 3 is a graph illustrating a time line of transaction flow actions per time unit in accordance with the preferred embodiment.
Figure 4A:
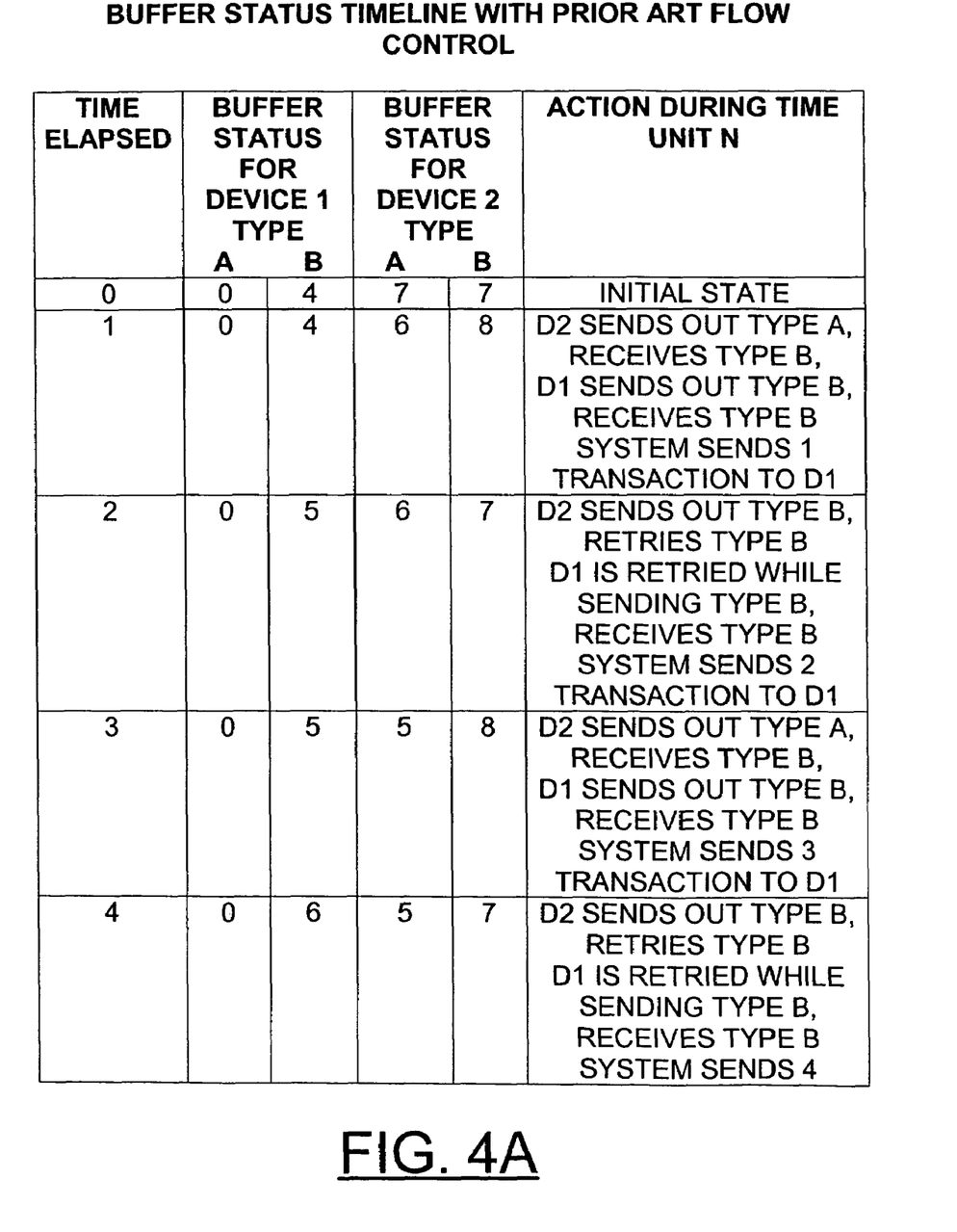
FIGS. 4A, 4B, 4C, and 4D are charts illustrating a time line of prior art transaction flow actions per time unit.
Figure 4B:
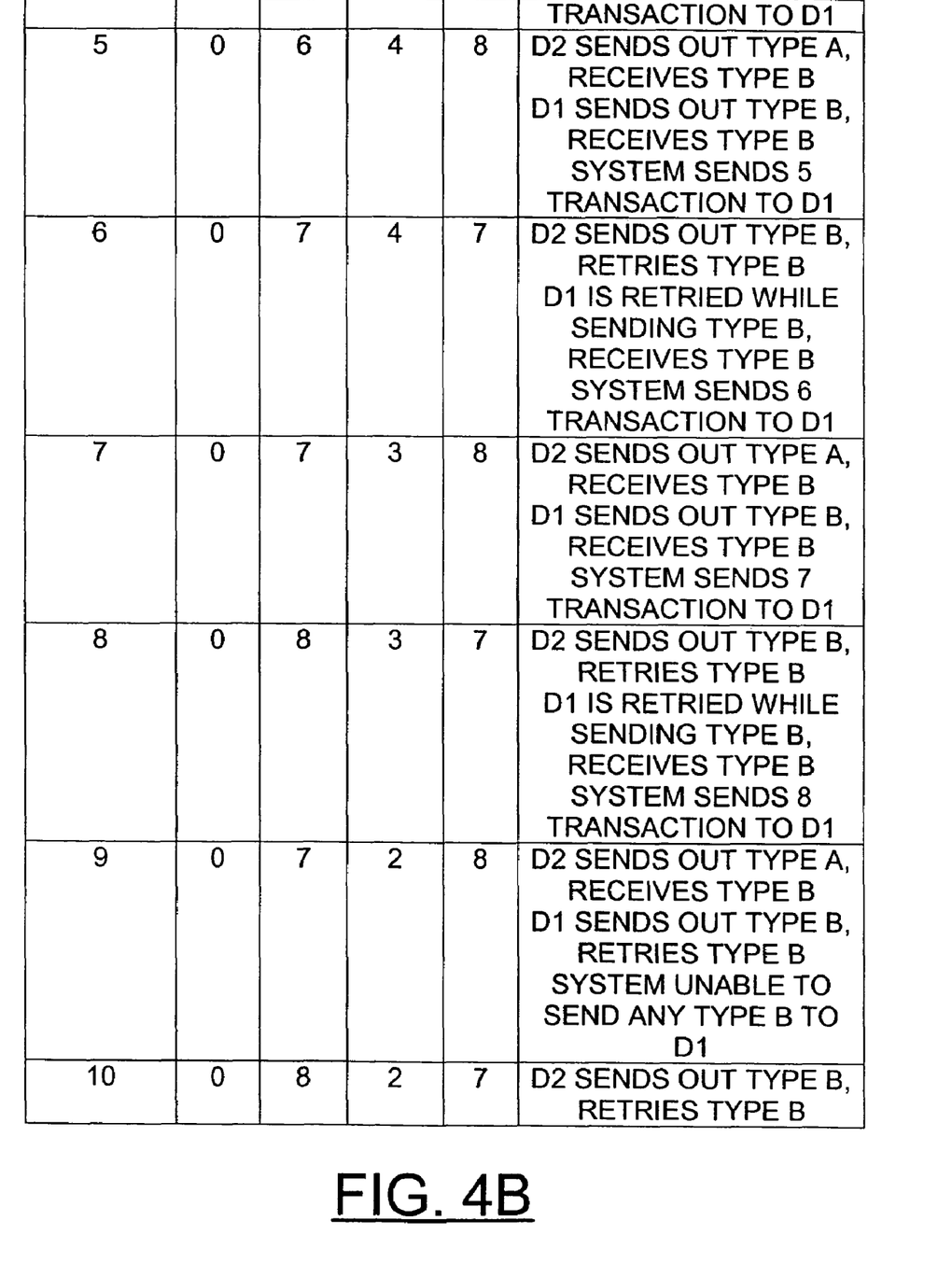
Figure 4C:
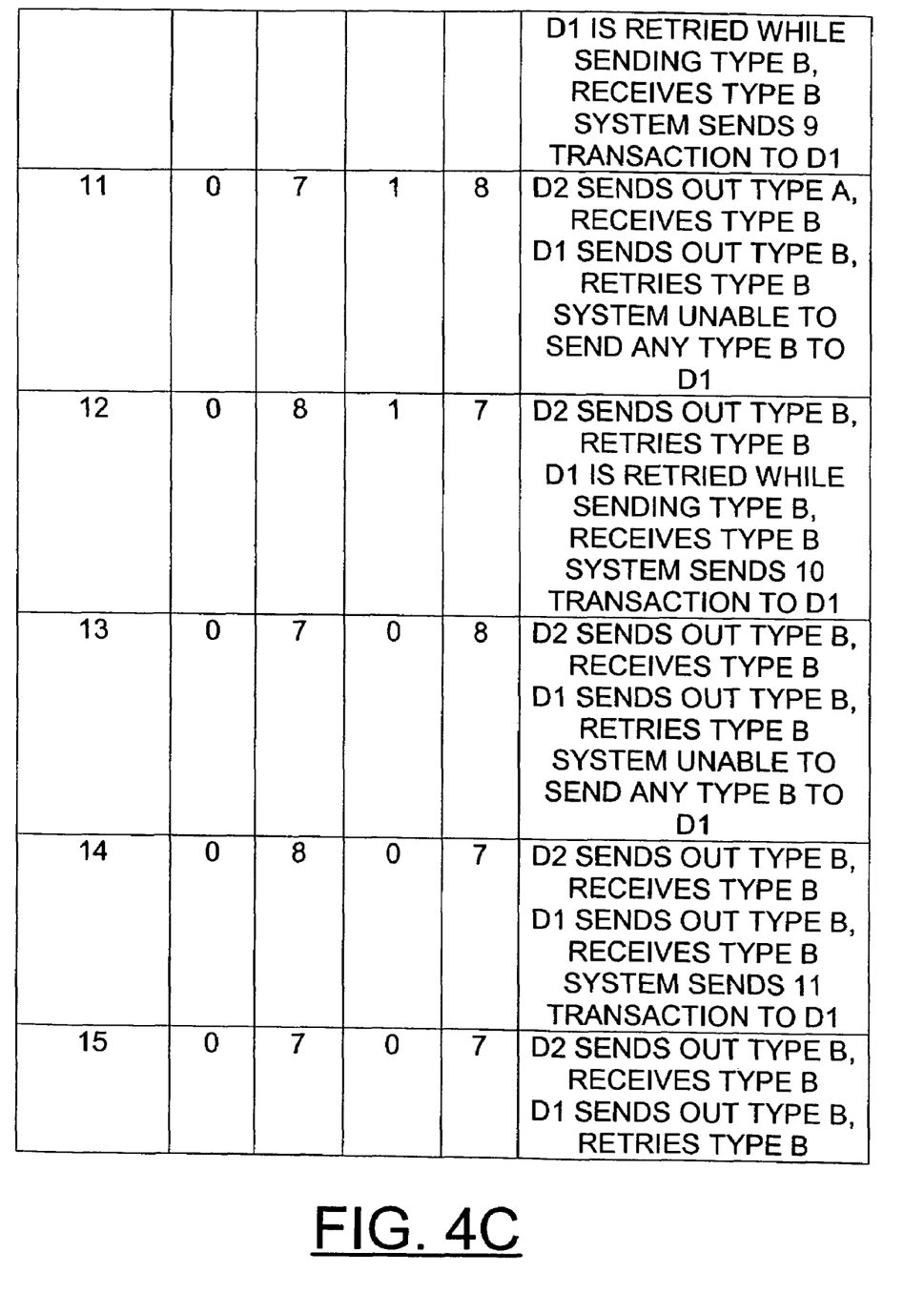
Figure 4D:
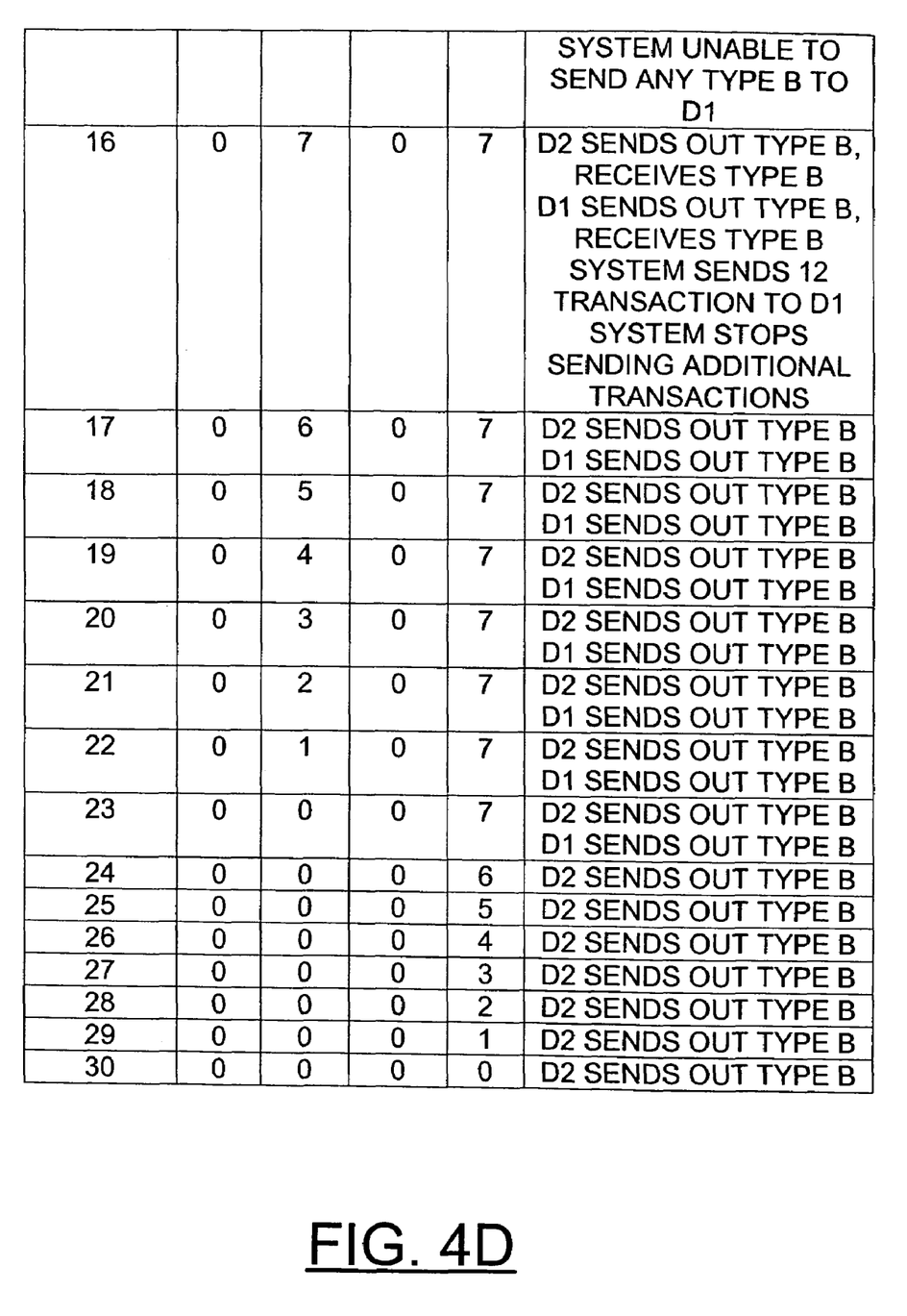
Figure 5A:
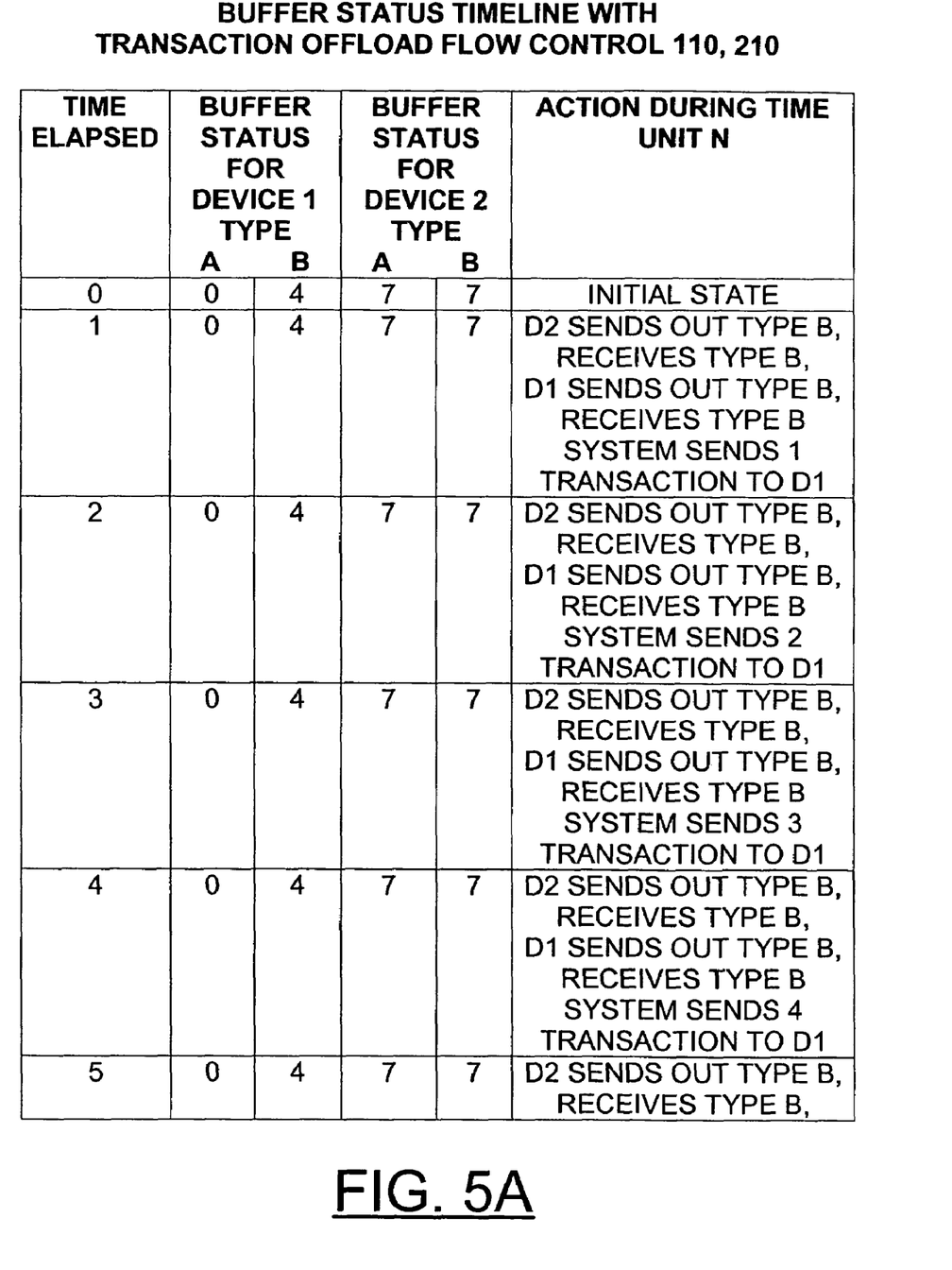
FIGS. 5A, 5B, and 5C are charts illustrating a time line of transaction flow actions per time unit in accordance with the preferred embodiment.
Figure 5B:
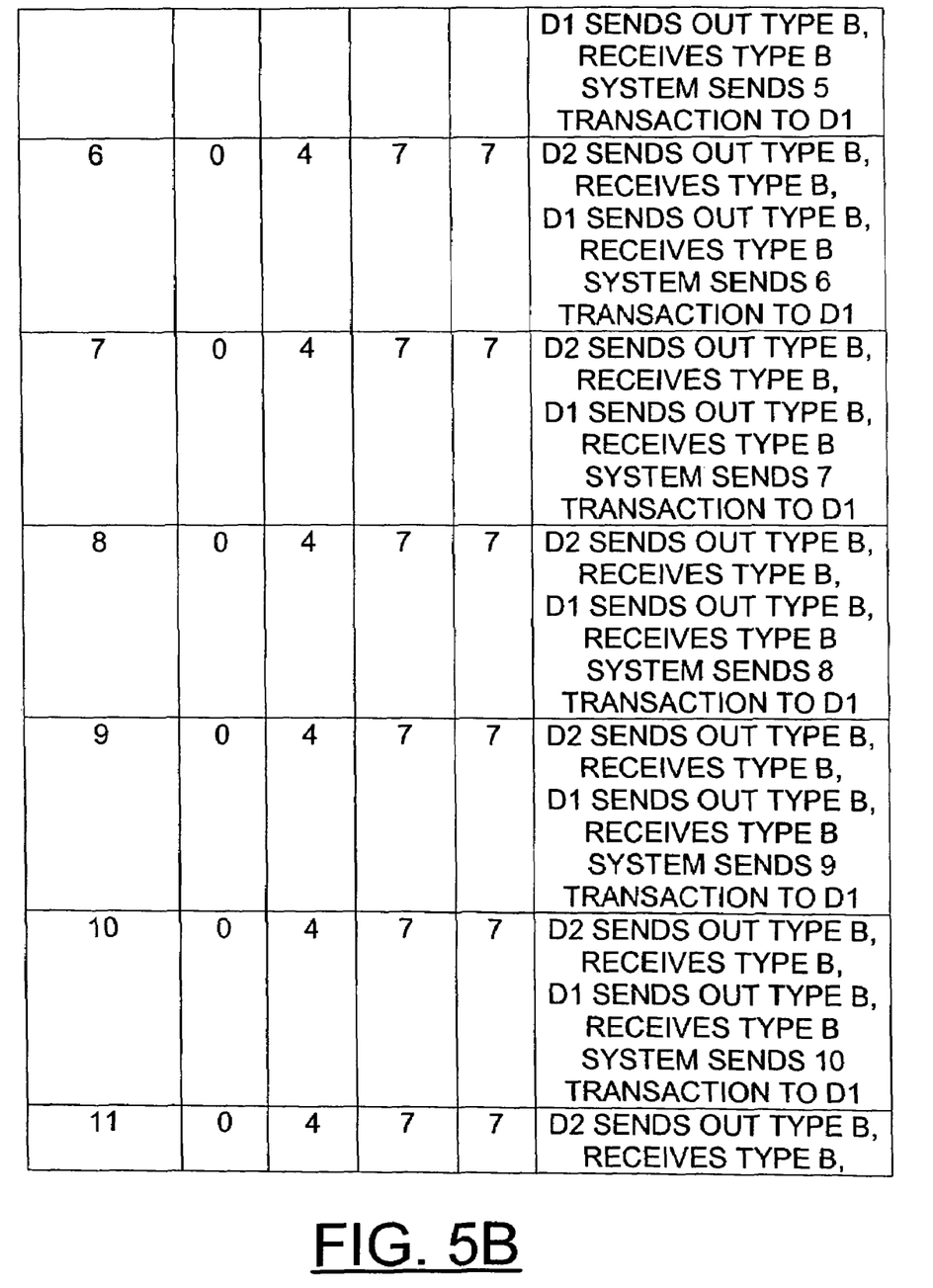
Figure 5C:
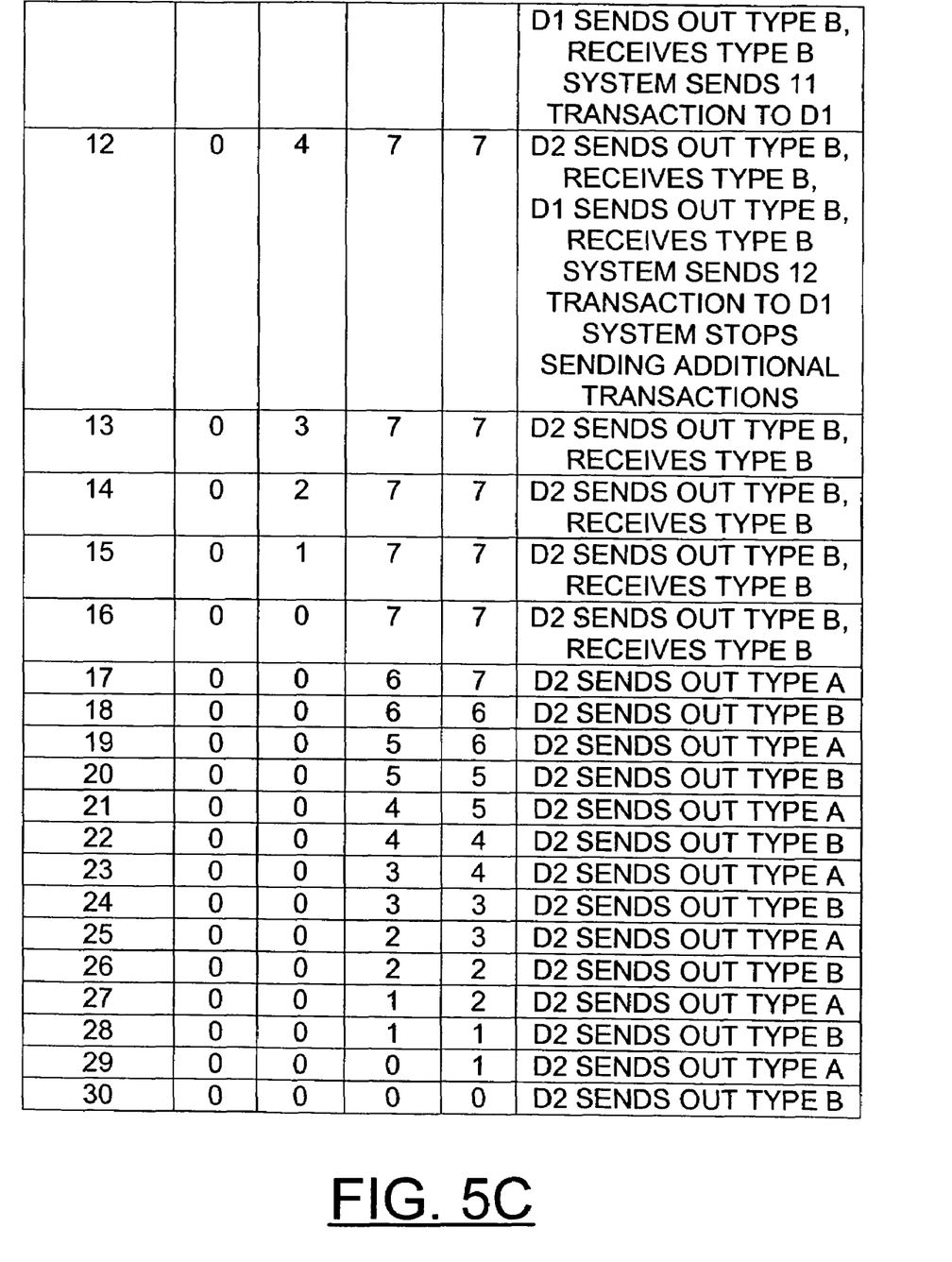

Referring also to FIG. 3 and FIGS. 5A, 5B, and 5C there are shown a time line of transaction flow actions per time unit in accordance with the preferred embodiment. As shown in FIG. 3 and FIGS. 5A, 5B, and 5C, using the buffer status 106, 206 of the respective sending device 1, 101 and sending device 2, 201 that is included in the transactions that are sent across to the respective receiver device 2, 201 and device 1, 101 expedites the data flow in the system and thereby avoids the need to issue the retry indication to the receiving device upstream. As can be seen from FIG. 3, the full buffer status or a buffer status value of 8 is never reached, thereby providing improvement over the prior art arrangement as shown in FIG. 2.

Figure 6:
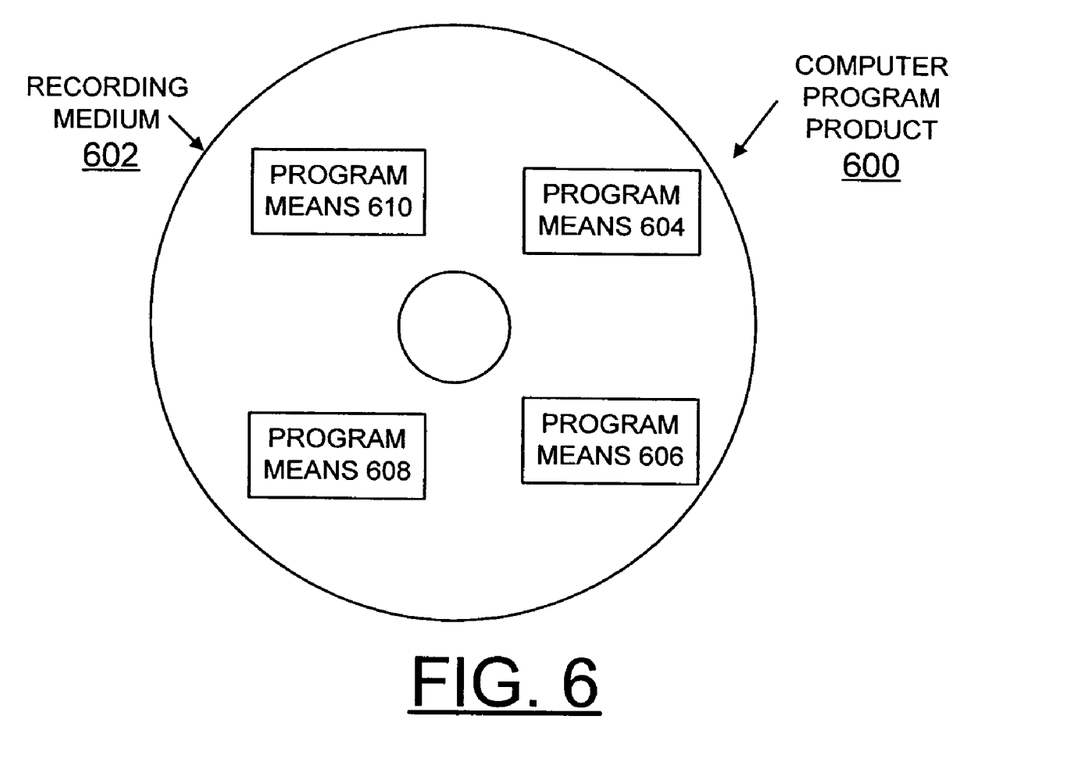
FIG. 6 is a block diagram illustrating a computer program product in accordance with the preferred embodiment.

Referring now to FIG. 6, an article of manufacture or a computer program product 600 of the invention is illustrated. The computer program product 600 includes a recording medium 602, such as, a floppy disk, a high capacity read only memory in the form of an optically read compact disk or CD-ROM, a tape, a transmission type media such as a digital or analog communications link, or a similar computer program product. Recording medium 602 stores program means 604, 606, 608, 610 on the medium 602 for carrying out the methods for optimizing packet flow control through buffer status forwarding of the preferred embodiment in the system 100 of FIG. 1.

A sequence of program instructions or a logical assembly of one or more interrelated modules defined by the recorded program means 604, 606, 608, 610, direct the computer system 100 for optimizing packet flow control through buffer status forwarding of the preferred embodiment.

While the present invention has been described with reference to the details of the embodiments of the invention shown in the drawing, these details are not intended to limit the scope of the invention as claimed in the appended claims.

What is claimed is:

1. A method for optimizing packet flow control through buffer status forwarding comprising the steps of:

provid­ing a sending device for sending transactions and a receiving device for receiving said transactions; each of said sending device and said receiving device including a plurality of buffers used for storing a plurality of respective different transaction types, and a register for storing buffer status information;

sending said stored buffer status information of said sending device in said transactions being sent to said receiving device, said buffer status information of said sending device including a respective number of buffers being used for each of said plurality of respective different transaction types;

using said stored buffer status information of said sending device by said receiving device for selecting transactions based upon said respective different transaction types to offload; and said plurality of said respective different transaction types include a type A transaction and a type B transaction, and wherein the step of using the buffer status information of the sending device by the receiving device for selecting transactions based upon said respective different transaction types to offload includes selecting to offload one of the type A transaction or the type B transaction to avoid filling all available buffers for either type A transactions or type B transactions.

2. An apparatus for optimizing packet flow control through buffer status forwarding in a computer system comprising:

a plurality of devices for sending and receiving transactions; each said device including a plurality of buffers used for storing a plurality of respective different transaction types, said plurality of said different transaction types including a type A transaction and a type B transaction, and a register for storing buffer status information, each sending device sending said stored buffer status information of the sending device in each said transaction being sent to a receiving device, said buffer status information of the sending device including a respective number of buffers being used for type A transactions and type B transactions; and each said device including a transaction offload flow control; said transaction offload flow control for receiving and using said stored buffer status information of the sending device for selecting transactions based upon said respective different transaction types to offload; and said transaction offload flow control using the buffer status information of the sending device for selecting to offload one of the type A transaction or the type B transaction to avoid filling all available buffers for either type A transactions or type B transactions of the sending device.

3. A computer recording medium storing a computer program product for optimizing packet flow control in a computer system including a sending device for sending transactions and a receiving device for receiving transactions; each of said sending device and said receiving device including a plurality of buffers used for storing a plurality of respective different transaction types, and a register for storing buffer status information, said transactions including a type A transaction and a type B transaction, and said buffer status information of said sending device including a respective number of buffers being used for type A transactions and type B transactions; said computer program product including a plurality of computer executable instructions stored on said computer recording medium, wherein said instructions, when executed by the computer system, cause the computer system to perform the steps of:

sending said stored buffer status information of said sending device in transactions being sent to said receiving device;

using said stored buffer status information of said sending device by said receiving device for selecting transactions based upon said respective different transaction types to offload; and wherein the step of using the buffer status information of said sending device by said receiving device for selecting transactions based upon said respective different transaction types to offload includes selecting to offload one of the type A transaction or the type B transaction to avoid filling all available buffers for either type A transactions or type B transactions.

* * * * *